United States Patent
Bettoni

(10) Patent No.: US 10,320,321 B2
(45) Date of Patent: Jun. 11, 2019

(54) ELECTRIC MACHINE COMPRISING AN ALTERNATING CURRENT ELECTRIC MOTOR AND AN INVERTER

(71) Applicant: MAVEL S.r.l., Pont Saint Martin (AO) (IT)

(72) Inventor: Davide Bettoni, Pont Saint Martin (IT)

(73) Assignees: MAVEL S.R.L., Pont Saint Martin (AO) (IT); IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/366,385

(22) Filed: Dec. 1, 2016

(65) Prior Publication Data
US 2017/0085206 A1    Mar. 23, 2017

Related U.S. Application Data

(63) Continuation of application No. 14/084,135, filed on Nov. 19, 2013, now abandoned.

(30) Foreign Application Priority Data

Nov. 30, 2012 (IT) .............................. MI2012A2053

(51) Int. Cl.
*H02P 25/22* (2006.01)
*H02P 6/08* (2016.01)
(Continued)

(52) U.S. Cl.
CPC ........ *H02P 25/22* (2013.01); *H02M 7/53871* (2013.01); *H02P 5/74* (2013.01);
(Continued)

(58) Field of Classification Search
CPC .... H02P 1/38; H02P 5/74; H02P 25/22; H02P 6/085; H02P 23/28; H02P 27/08
See application file for complete search history.

(56) References Cited

U.S. PATENT DOCUMENTS

| 8,183,814 | B2 * | 5/2012 | Fuchs ...................... H02P 1/38 318/524 |
| 2004/0160201 | A1 | 8/2004 | Rahman et al. |

(Continued)

OTHER PUBLICATIONS

Italian Search Report dated Aug. 6, 2013 for Italian Application No. MI2012A002053.

*Primary Examiner* — Eduardo Colon Santana
*Assistant Examiner* — Said Bouziane
(74) *Attorney, Agent, or Firm* — Harness, Dickey & Pierce, P.L.C.

(57) ABSTRACT

An electric machine includes an alternating current electric motor comprising two semi-windings and an inverter comprising at least two inverter branches which are electrically connected each one to a respective semi-winding. The machine also includes a control unit which provides respective control signals to the two inverter branches so that they induce two alternating currents of frequency in the respective semi-windings. The control signals of the two inverter branches have a frequency smaller than the frequency and are also reciprocally out of phase by 180° relative to the frequency. This allows reducing ripples of the overall alternating current resulting from the sum of the two alternating currents provided by the two semi-windings.

18 Claims, 4 Drawing Sheets

(51) Int. Cl.
*H02P 27/08* (2006.01)
*H02P 5/74* (2006.01)
*H02M 7/5387* (2007.01)
*H02P 23/28* (2016.01)

(52) U.S. Cl.
CPC .............. *H02P 6/085* (2013.01); *H02P 23/28* (2016.02); *H02P 27/08* (2013.01)

(56) References Cited

U.S. PATENT DOCUMENTS

| | | | |
|---|---|---|---|
| 2011/0074326 A1* | 3/2011 | Su | H02P 5/74 318/400.27 |
| 2011/0074328 A1 | 3/2011 | Su | |
| 2011/0156627 A1 | 6/2011 | Nakamura et al. | |

* cited by examiner

ELECTRIC MACHINE COMPRISING AN ALTERNATING CURRENT ELECTRIC MOTOR AND AN INVERTER

This is a continuation of U.S. application Ser. No. 14/084,135, filed on Nov. 19, 2013, which claims priority under 35 U.S.C. § 119 from Italian Patent Application No. MI 2012 A 002053, filed on Nov. 30, 2012, in the Italian Patent and Trademark Office, the entire contents of each of which are incorporated herein by reference.

The present invention relates in general to the field of electric machines. In particular, the present invention relates to an electric machine comprising an alternating current electric motor (in particular, but not exclusively, a three-phase electric motor) and an inverter suitable for supplying said electric motor.

As is known, a three-phase electric motor comprises a stator which generates a rotating magnetic field with a rotational frequency $f_R$ and a rotor which generates a stationary magnetic field. The stationary magnetic field of the rotor over time tends to remain aligned with the rotating magnetic field generated by the stator, thus inducing a rotation of the rotor with respect to the stator with rotational frequency $f_R$.

In order to generate the rotating magnetic field, the stator typically comprises three windings which are supplied by a three-phase electric current. Each winding in particular is supplied with a respective periodic phase current with period $1/f_R$ and phase of 120° with respect to the phase currents which supply the other two windings.

The three-phase current which supplies the windings is generally provided by an inverter.

As is known, an inverter is a device which is suitable for converting a direct voltage into an alternating voltage. For this purpose, an inverter generally comprises one or more inverter branches arranged in parallel. Each branch typically comprises two switches (for example two BJT transistors) arranged in series and switchable between an open state and a closed state. Each switch is in turn arranged in an anti-parallel configuration with a respective diode. The various branches of the inverter are connected together in parallel and are connected to a direct voltage generator. The switches of each branch are alternately opened and closed so that the branch provides an alternating voltage at its middle point (namely a point situated between the two switches of the branch).

In order to supply a three-phase motor, each winding of the stator is connected to one or more inverter branches, so that the voltage provided by the inverter branch(es) induces a phase current across the winding. Inverter branches connected to a same winding are driven in-phase with each other. Inverter branches connected to different windings are instead driven with a reciprocal phase difference of 120° relative to the rotational frequency $f_R$.

In order to maximize the efficiency of the electric motor (or minimize the power which it dissipates) each winding shall be supplied with a phase current having a waveform which is as similar as possible to that of a sinusoid with frequency $f_R$. In other words the amplitude of the higher harmonics of the waveform of each phase current shall be minimized.

In order to achieve this aim, it is known to use the PWM (Pulse Width Modulation) technique. This technique envisages driving each inverter branch so that the voltage which it generates has the form of a sequence of substantially rectangular pulses with a pulse frequency $f_P$ greater than the rotational frequency $f_R$ (the pulse frequency $f_P$ being defined as the reciprocal of the time which lapses between the leading edges of two consecutive pulses).

Since each winding of the stator is substantially an inductance, the voltage generated by the inverter branch(es) to which it is connected induces across it a phase current which is proportional to the integral of the voltage itself. By suitably modulating the duration of the voltage pulses, it is therefore possible to ensure that the phase current which crosses the winding approximates a sinusoid of frequency $f_R$. The greater the ratio between the pulse frequency $f_P$ and the rotational frequency of the motor $f_R$, the greater the accuracy of the approximation which can be obtained and therefore the smaller the power dissipated by the motor.

With an increase in the pulse frequency $f_P$, however, the power dissipated by the same inverter increases. Although in fact the inverter dissipates a very small power in stationary conditions (namely when the two switches of each branch are in the open state or the closed state), switching of the switches between the open state and the closed state results in power dissipation, which increases with an increase in the frequency at which the switches are switched.

In the case, therefore, of motors for high-speed applications (namely motors with a rotational frequency $f_R$ corresponding to 30,000-300,000 rpm) or multi-polar motors, in order to minimize the power dissipated by the motor the inverter branches shall be driven with a very high pulse frequency $f_P$, thus increasing significantly the power dissipated by the inverter.

In the light of the above, the object of the present invention is to provide an electric machine comprising an alternating current electric motor (in particular, but not exclusively, a three-phase electric motor) and an inverter suitable for supplying said motor, which solves the above-mentioned problem, namely which allows a reduction in the power dissipated by the motor as a result of the presence of higher harmonics in the power supply current and/or the power dissipated by the inverter as a result of switching of its switches.

According to embodiments of the present invention this object is achieved by an electric machine, the motor of which comprises two semi-windings per phase, instead of a single winding per phase. Each semi-winding is supplied by a respective inverter branch. The two inverter branches which supply the two semi-windings associated with a same phase are driven so as to generate respective sequences of voltage pulses with a same pulse frequency $f_P$, which induce in the two semi-windings two phase currents which are associated with the same phase and which are proportional to the integrals of the two voltage pulse sequences. The two inverter branches are driven in phase opposition (namely out of phase by 180°) relative to the pulse frequency $f_P$, namely are reciprocally delayed in time relative to each other by $\frac{1}{2}f_P$.

In this way, also the two phase currents associated with the same phase are delayed in time relative to each other by $\frac{1}{2}f_P$. The sum of the two phase currents associated with the same phase gives rise to an overall phase current which in turn induces a phase magnetic flux through the two semi-windings. This overall phase current and the phase magnetic flux induced by it have a waveform which approximates a sinusoid of frequency $f_R$. In particular, the waveform has oscillations with respect to the sinusoid of frequency $f_R$, the frequency of which is $2f_P$, namely double that which would be obtained with a single winding per phase supplied by one or more inverter branches driven in-phase with each other at frequency $f_P$. On the other hand, the amplitude of the oscillations with respect to the sinusoid is substantially half that which would be obtained with a single winding per phase supplied by one or more inverter branches driven in-phase with each other at frequency $f_P$. In other words, for the same pulse frequency $f_P$ at which the inverter branches are driven, a much more accurate approximation of the sinusoid of frequency $f_R$ is obtained. Therefore, for the same power dissipated by the inverter (namely for the same pulse frequency $f_P$), the power dissipated by the motor is reduced significantly because the amplitude of the higher harmonics of the overall phase current and magnetic flux induced by it is reduced.

On the other hand, it is possible to obtain the same power dissipated by the motor (namely the same amplitude of the higher harmonics of the phase current) by driving the inverter at a pulse frequency $f_P$ which is substantially halved, thus reducing the power dissipated by the inverter.

According to a first aspect, the present invention provides an electric machine comprising an alternating current electric motor comprising a first semi-winding and a second semi-winding;
an inverter comprising at least one first inverter branch electrically connected to the first semi-winding and at least one second inverter branch electrically connected to the second semi-winding;
a control unit suitable for providing a first control signal to the first inverter branch so as to induce a first alternating current in the first semi-winding and a second control signal to the second inverter branch so as to induce a second alternating current in the second semi-winding, the first alternating current and the second alternating current having a first frequency $f_R$, the first control signal and the second control signal having a second frequency $f_P$ smaller than the first frequency $f_R$ and being reciprocally out of phase by substantially 180° relative to the second frequency $f_P$.

Preferably, the alternating current electric motor is a three-phase electric motor and the sum of the first alternating current and the second alternating current is a phase of a three-phase current.

Preferably, the first semi-winding and the second semi-winding are electrically connected according to a "Y" configuration or a "Δ" configuration.

Preferably, the first semi-winding and the second semi-winding are arranged so as to behave as a primary winding and a secondary winding of a transformer.

Preferably, the first semi-winding and the second semi-winding have electric inductances having a same value.

According to preferred embodiments, the inverter comprises a number N≥1 of first inverter branches electrically connected to the first semi-winding and a same number N≥1 of second inverter branches electrically connected to the second semi-winding.

Preferably, each one of the first inverter branch and the second inverter branch comprises:

a first switch;
a second switch arranged in series with the first switch;
a first diode arranged in an anti-parallel configuration with the first switch; and
a second diode arranged in an anti-parallel configuration with the second switch, the first switch and the second switch being connected to the control unit and being suitable for being switched between an open state and a closed state.

Preferably, the first control signal is configured so that the first inverter branch provides a first voltage across the first semi-winding and the second control signal is configured so that the second inverter branch provides a second voltage across the second semi-winding, the first voltage and the second voltage having a same waveform and being reciprocally delayed in time by substantially $\frac{1}{2}f_P$.

Preferably, the waveform comprises a sequence of pulses with pulse frequency equal to the second frequency $f_P$.

According to a second aspect the present invention provides a method for supplying an alternating current electric motor comprising a first semi-winding and a second semi-winding by means of an inverter comprising a first inverter branch electrically connected to the first semi-winding and a second inverter branch electrically connected to the second semi-winding, the method comprising:

providing a first control signal to the first inverter branch so as to induce a first alternating current in the first semi-winding; and
providing a second control signal to the second inverter branch so as to induce a second alternating current in the second semi-winding, the first alternating current and the second alternating current having a first frequency $f_R$, wherein the first control signal and the second control signal have a second frequency $f_P$ smaller than the first frequency $f_R$ and are reciprocally out of phase by substantially 180° relative to the second frequency $f_P$.

The present invention will become clearer in the light of the following detailed description provided by way of a non-limiting example to be read with reference to the accompanying drawings in which.

Figure 1:
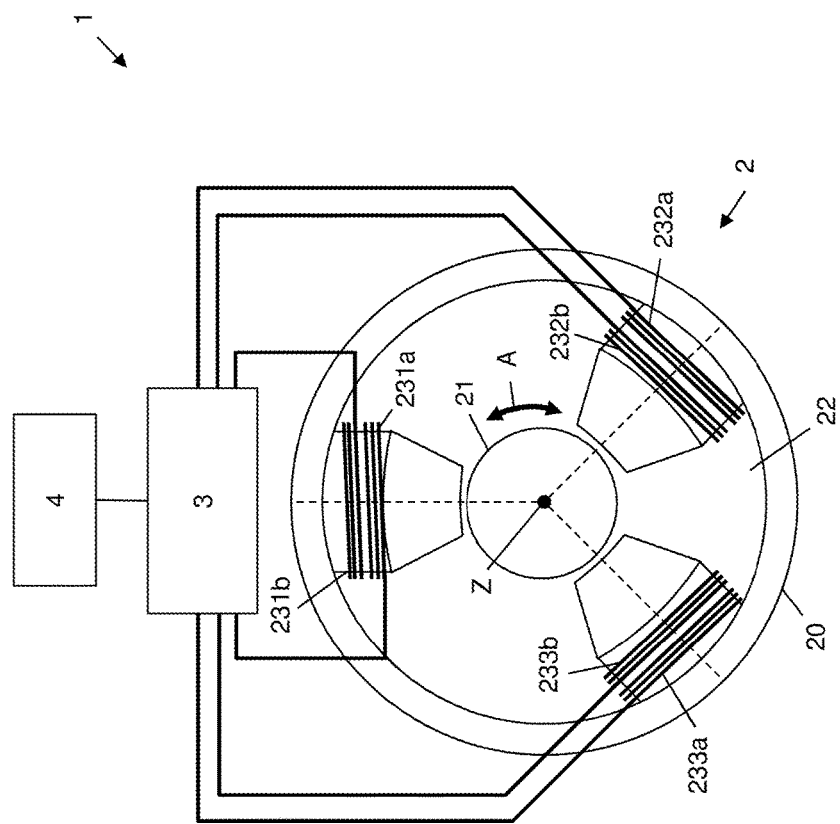
FIG. 1 shows schematically an electric machine according to an embodiment of the present invention.

FIG. 1 shows an electric machine 1 according to an embodiment of the present invention. The electric machine 1 preferably comprises an electric motor 2, an inverter 3 and a control unit 4.

The electric motor 2 preferably is an alternating current motor, more preferably a three-phase electric motor.

In particular, the electric motor 2 preferably comprises a stator 20 and a rotor 21. The stator 20 preferably defines a cavity 22 inside which the rotor 21 is housed rotatably about an axis of rotation Z. The rotor 21 preferably comprises means (not shown in FIG. 1) for generating a stationary magnetic field.

Figure 2:
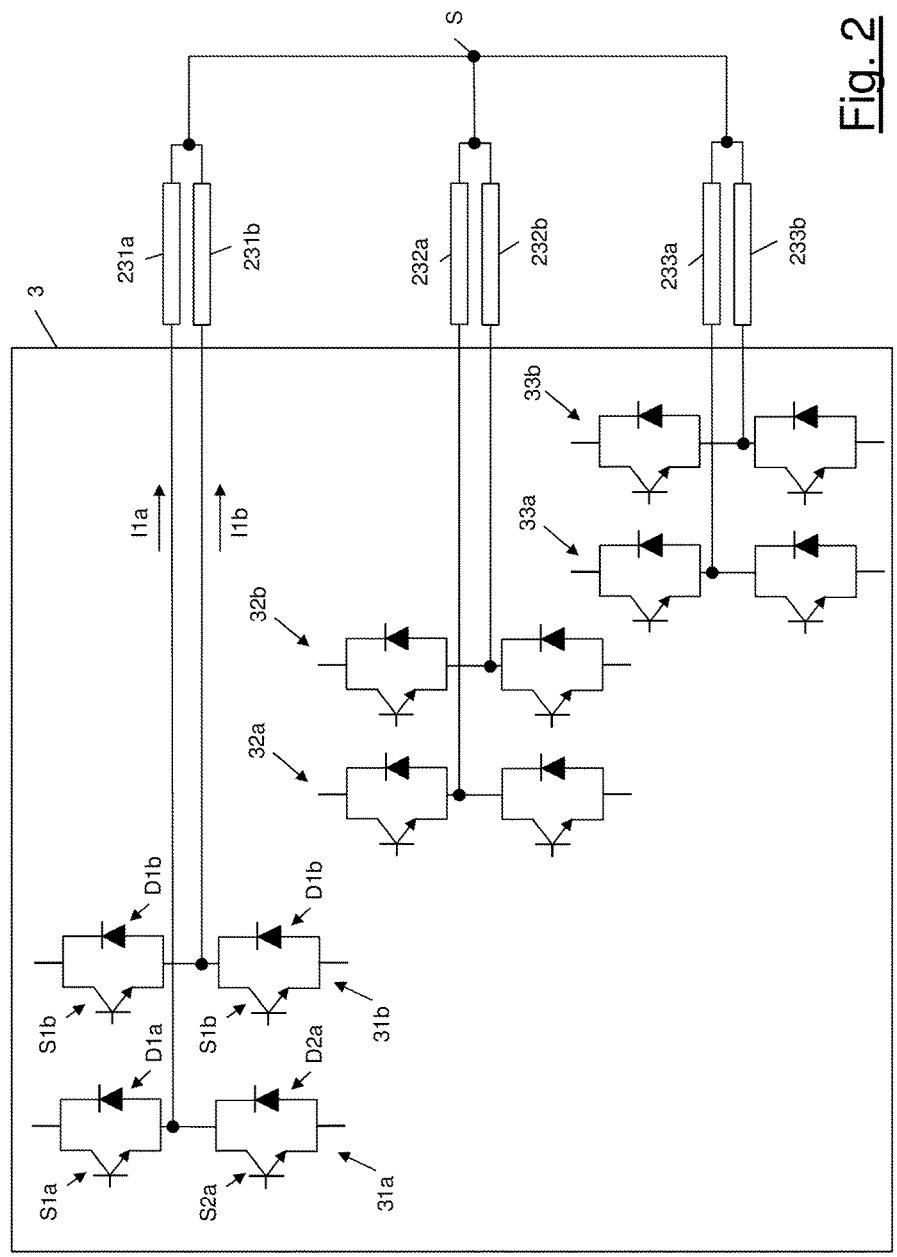
FIG. 2 shows an electrical scheme of a portion of the electric machine shown in FIG. 1.

The stator 20 preferably comprises three pairs of semi-windings (namely one pair for each phase) 231a/231b, 232a/232b, 233a/233b arranged in positions angularly spaced at 120° in the circumferential direction. Preferably the two semi-windings of each pair are arranged so as to act as a primary winding and secondary winding of a transformer. For example, the two semi-windings of each pair may be housed inside a same cavity of the stator 20. The semi-windings 231a/231b, 232a/232b, 233a/233b preferably have the same electrical characteristics, in particular have the same inductance. The semi-windings 231a/231b, 232a/232b, 233a/233b are preferably connected together in a star ("Y") configuration, namely have a first end connected to a star centre S, as shown in FIG. 2. According to embodiments not shown in the drawings, the semi-windings 231a/231b, 232a/232b, 233a/233b may be connected together in a triangle ("Δ") configuration.

As shown in FIG. 2, the inverter 3 preferably comprises a number of parallel inverter branches. In particular, the inverter 3 preferably comprises a same number N≥1 of parallel inverter branches for each semi-winding of the electric motor 2. By way of a non-limiting example, the inverter 3 shown in FIG. 2 comprises N=1 inverter branch 31a/31b, 32a/32b, 33a/33b for each semi-winding 231a/231b, 232a/232b, 233a/233b of the motor 3.

With reference to the inverter branches 31a/31b, each inverter branch preferably comprises a first switch S1a/S1b, a second switch S2a/S2b arranged in series with the first switch S1a/S1b, a first diode D1a/D1b arranged in an anti-parallel configuration with the first switch S1a/S1b and a second diode D2a/D2b arranged in an anti-parallel configuration with the second switch S2a/S2b. Each switch S1a/S1b and S2a/S2b is preferably connected to the control unit 4 and is configured to receive from it a respective control signal suitable for switching the switch between an open state and a closed state, as will be described in greater detail hereinbelow. The other two pairs of inverter branches 32a/32b, 33a/33b have a structure substantially identical to that of the inverter branches 31a/31b, and therefore a detailed description will not be repeated. The inverter branches 31a/31b, 32a/32b, 33a/33b are preferably all connected to one or more direct voltage generators which supply a dc supply voltage V across them.

Each semi-winding 231a/231b, 232a/232b, 233a/233b is preferably connected to a respective inverter branch 31a/31b, 32a/32b, 33a/33b. In particular, with reference for example to the semi-windings 231a/231b, each semi-winding 231a/231b has its end opposite to the star centre S connected to the middle point of the branch 31a/31b, namely between the first switch S1a/S1b and the second switch S2a/S2b.

Operation of the electric machine 1 will now be described in detail, with reference in particular to the semi-windings 231a/232b and to the inverter branches 31a/31b which supply them.

In the inverter branch 31a, when the first switch S1a is in the closed state and the second switch S2a is in the open state, the inverter branch 31a generates across the semi-winding 231a a positive voltage V1a=+V. When instead the first switch S1a is in the open state and the second switch S2a is in the closed state, the inverter branch 31a generates across the semi-winding 231a a negative voltage V1a=−V. When, finally, both the switches S1a, S2a are in the closed state, the inverter branch 31a generates across the semi-winding 231a a voltage V1a=0. The switches S1a and S1b may therefore be switched temporally between the open state and the closed state so as to modulate temporally the voltage V1a.

Figure 3:
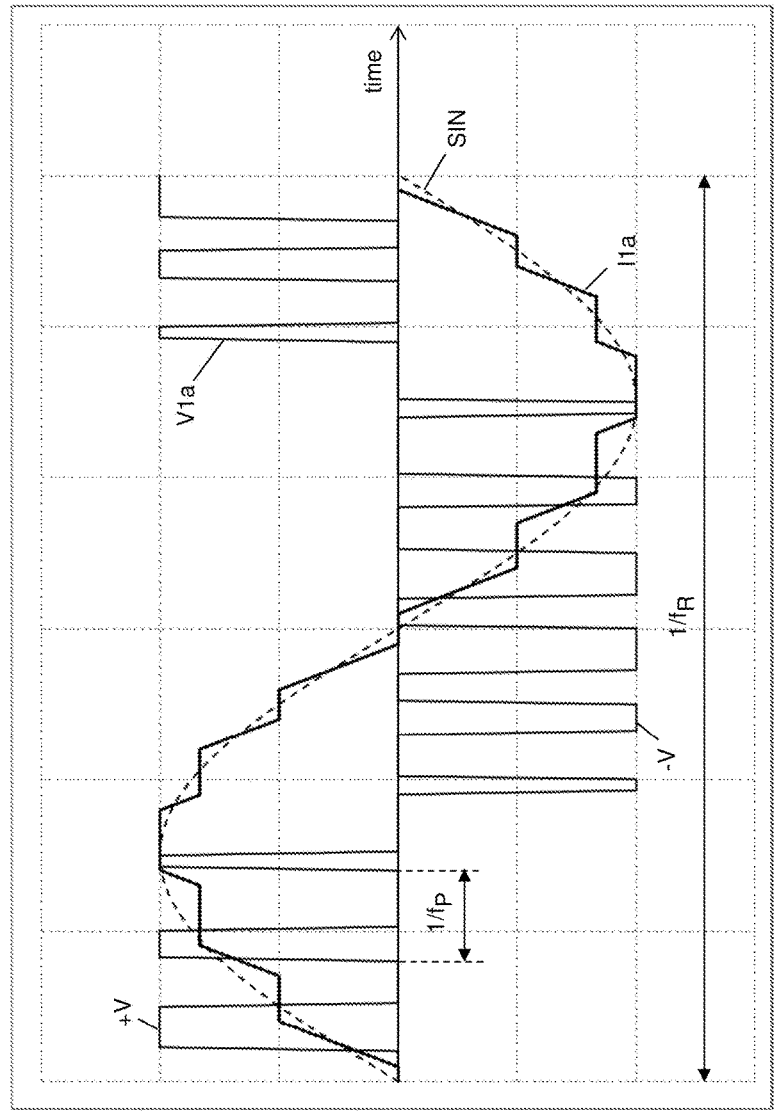
FIG. 3 is a time diagram of the voltage provided by an inverter branch and the phase current induced by this voltage in one of the semi-windings shown in FIGS. 1 and 2.

In particular, preferably, the control unit 4 sends to the two switches S1a, S2a of the inverter branch 31a control signals so that the voltage V1a has a waveform of a sequence of pulses with pulse frequency $f_P$, the pulse frequency being defined as the inverse of the time which lapses between the leading edges of two consecutive pulses. The pulse frequency $f_P$ is chosen so as to be greater than the rotational frequency $f_R$ of the rotor 21 which is to be obtained. Preferably, the pulse frequency $f_P$ is greater than or equal to $10 \cdot f_P$. The pulses may have a positive polarity (namely amplitude +V) or negative polarity (namely amplitude −V). The pulses may moreover have a variable duration or duty cycle, as shown in FIG. 3.

The voltage V1a induces a phase current I1a across the semi-winding 231a. Since the semi-winding 231a is substantially an inductance from an electrical point of view, the phase current I1a which crosses it is proportional to the integral of the voltage Va1 generated by the inverter branch 31a. The phase current I1a therefore has a waveform which depends on the polarity and the duration or duty cycle of the voltage pulses V1a. Preferably the control signals provided by the control unit 4 to the switches S1a, S2a are chosen so that the phase current I1a has a waveform of a broken line which approximates a sinusoid SIN of frequency $f_R$, as shown in FIG. 3.

The inverter branch 31b and the semi-winding 231b connected thereto operate in a manner similar to that described above. In other words, the control unit 4 preferably also sends to the switches S1b, S2b control signals able to switch the switches S1b, S2b between a closed state and an open state so as to generate a voltage V1b which induces across the semi-winding 231b a phase current I1b proportional to the integral of the voltage V1b. Preferably the switches S1b, S2b are driven so that the phase current I1b also has a waveform of a broken line which approximates the sinusoid SIN of frequency $f_R$.

However, according to embodiments of the present invention, the switches S1b, S2b of the inverter branch 31b are driven in phase opposition (namely out of phase by 180°) with respect to the switches S1a, S2a of the inverter branch 31a. In other words, the control signals which the control unit 4 sends to the switches S2a, S2b are identical to the control signals which the control unit sends to the switches S1a, S1b, but are delayed in time relative thereto by $\frac{1}{2}f_P$. In this way, the voltage V1a generated by the inverter branch 31a and the voltage V1b generated by the inverter branch 31b have waveforms which are identical (namely have the same pulse sequence), but are delayed in time with respect to each other by $\frac{1}{2}f_P$. Consequently, the phase current I1a and the phase current I1b also have waveforms which are the same (namely the same broken line which approximates the sinusoid SIN of frequency $f_R$), but are delayed in time with respect to each other by $\frac{1}{2}f_P$.

The sum of the two phase currents I1=I1a+I1b is therefore also a broken line which approximates the sinusoid SIN of frequency $f_R$. However, owing to the reciprocal phase difference of 180° of the two phase currents I1a and I1b based on the times of the pulse frequency $f_P$, the overall phase current I1 approximates the sinusoid SIN in a more accurate manner. In particular, the accuracy of the approximation (namely the amplitude of the higher harmonics) is comparable to that which would be obtained with a single phase winding supplied by a single inverter branch driven with a pulse frequency $2f_P$.

Figure 4:
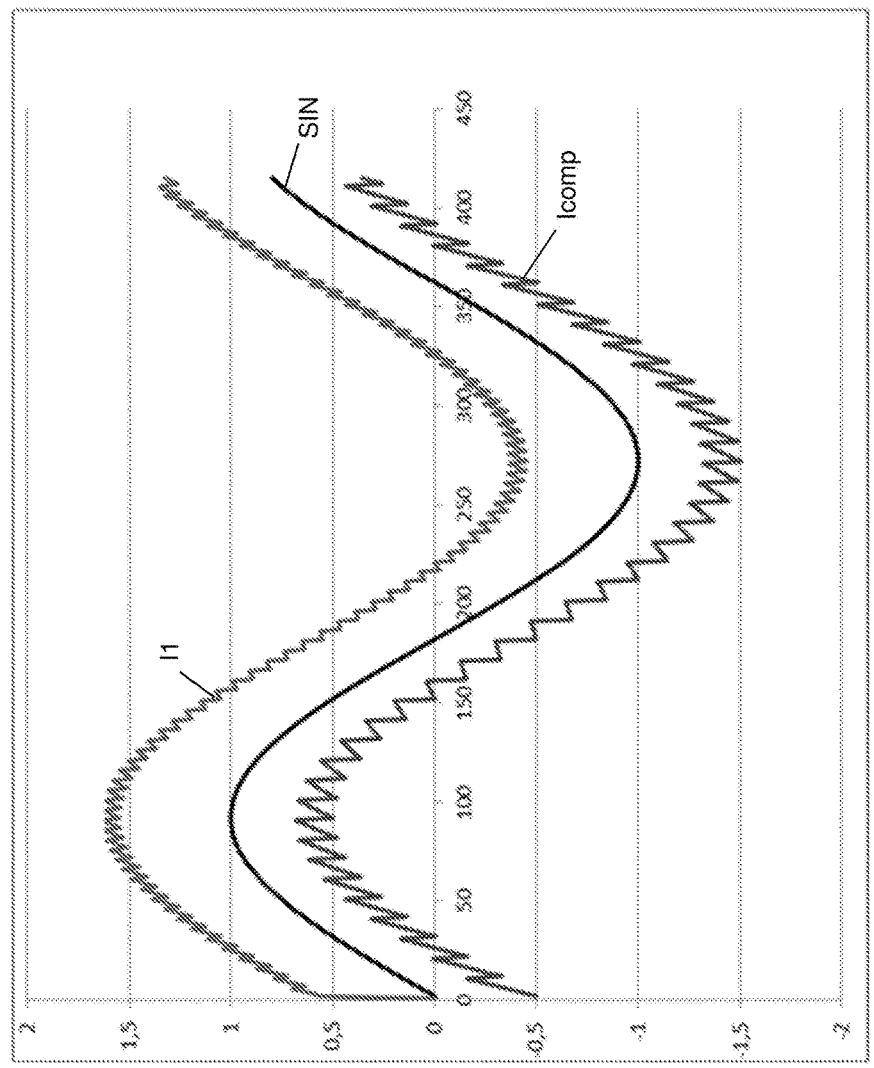
FIG. 4 is a graph which shows the result of a numerical simulation relating to operation of the machine according to FIG. 1.

FIG. 4 is a graph showing the results of a numerical simulation performed by the inventors. The current Icomp is a comparative phase current which crosses a winding supplied by a single inverter branch driven with pulse frequency $f_P$. The current I1 is instead the phase current obtained as the sum of two phase currents which cross two semi-windings which are connected in a star configuration and supplied by two inverter branches driven with a pulse frequency $f_P$ and in phase-opposition. As can be seen from the graph, the ripples of the current I1 with respect to the sinusoid SIN have an amplitude which is substantially halved compared to ripples of the comparative current Icomp and a double frequency $2f_P$. This means that, for the same power dissipated by the inverter 3 (namely for the same pulse frequency $f_P$), the power dissipated by the electric motor 2 is advantageously reduced. Similarly, it is possible to obtain the same power dissipated by the motor 2 (namely the same accuracy of approximation of the sinusoid SIN) reducing the pulse frequency $f_P$ and therefore the power dissipated by the inverter 3.

Operation of the other pairs of inverter branches 32a/32b, 33a/33b is preferably similar to that of the pair of inverter branches 31a/31b. In particular, the control unit 4 preferably sends to the switches of the branches 32a and 32b control signals which are identical but reciprocally out of phase by 180° (namely delayed in time with respect to each other by $\frac{1}{2}f_P$) so that the phase currents which cross the two semi-windings 232a and 232b have the same waveform (namely a broken line which approximates the sinusoid SIN of frequency $f_R$) and are delayed in time with respect to each other by $\frac{1}{2}f_P$. Similarly, the control unit 4 preferably sends to the switches of the branches 33a and 33b control signals which are identical, but reciprocally out of phase by 180° (namely delayed in time with respect to each other by $\frac{1}{2}f_P$), so that the phase currents which cross the two semi-windings 233a and 233b have waveforms which are the same (namely a broken line which approximates the sinusoid SIN of frequency $f_R$) and are delayed in time with respect to each other by $\frac{1}{2} f_P$.

The control signals provided by the control unit 4 to the pairs of branches 31a/31b, 32a/32b and 33a/33b are moreover reciprocally out of phase by 120° relative to the rotational frequency $f_R$. In this way the three pairs of semi-windings 231a/231b, 232a/232b, 233a/233b provide a three-phase alternating current comprising three overall phase currents I1, I2, I3 which are approximately sinusoidal with frequency $f_R$ and reciprocally out of phase by 120°, each of which having ripples with frequency $2 f_P$ relative to the sinusoid SIN. This three-phase alternating current generates a rotating magnetic field with rotational frequency $f_R$ which induces a rotation of the rotor 21 with respect to the stator 20 (indicated by the arrow A in FIG. 1).

The electric machine described above offers various advantages.

First and foremost, as discussed above, for the same power dissipated by the inverter 3, it is possible to reduce the power dissipated by the electric motor 2. For the same pulse frequency $f_P$, the phase currents provided by each pair of semi-windings approximate in fact in a more accurate manner an ideal sinusoid compared to the phase current generated by a single winding, since it has ripples with frequency which is doubled and an amplitude which is substantially halved. On the other hand, for the same power dissipated by the motor 2 it is possible to reduce the power dissipated by the inverter 3. It is in fact possible to obtain phase currents which approximate an ideal sinusoid with the same accuracy (namely with ripples having the same frequency and same amplitude) as the phase current generated by a single winding driving the inverter with a pulse frequency $f_P$ which is substantially halved.

Moreover, advantageously, the electric machine 1 may be produced substantially at no additional cost compared to the known machines. In fact, the known electric machines for high-speed applications typically comprise two inverter branches for each phase. This allows the inverter to be driven at particularly high frequencies. However, in the known machines the inverter branches associated with a same phase are driven in-phase with each other. In order to provide an electric machine according to embodiments of the present invention it is sufficient to reconfigure the logic of the control unit which drives the inverter branches so that the inverter branches associated with a same phase are driven in phase opposition to each other and not in-phase. This modification, however, advantageously does not involve substantially any additional cost for the machine.

Moreover, advantageously, the two semi-windings associated with a same phase behave as though they were a transformer. Therefore, when a phase current with non-zero intensity flows in one of the two semi-windings, a current is induced also in the other semi-winding independently of the voltage generated by the inverter branch supplying it. When the switches of this inverter branch are switched so as to induce a phase current with non-zero intensity also in this latter semi-winding, the switching losses are advantageously reduced, because the induced current was already flowing in the semi-winding.

Although the inverter 3 of the electric machine 1 described above comprises a single inverter branch for each semi-winding, this is not limiting. The inverter may in fact comprise a number N≥1 of inverter branches for each semi-winding. Preferably, the number of inverter branches which supply a semi-winding is the same for all the semi-windings. For example, each semi-winding may be supplied by three parallel inverter branches. Inverter branches which supply a same semi-winding are preferably driven in-phase with each other.

The invention claimed is:

1. An electric machine, comprising:
an alternating current electric motor comprising a first semi-winding and a second semi-winding, the first semi-winding including three first sub-windings, the three first sub-windings electrically connected according to a "Y" configuration or a "Δ" configuration, the second semi-winding including three second sub-windings, the three second sub-windings electrically connected according to a "Y" configuration or a "Δ" configuration;
an inverter comprising a first inverter branch electrically connected to the first semi-winding and a second inverter branch electrically connected to the second semi-winding; and
a control unit configured to provide a first control signal to the first inverter branch, so as to induce a first alternating current in the first semi-winding, and a second control signal to the second inverter branch, so as to induce a second alternating current in the second semi-winding;
wherein the first alternating current and the second alternating current have a first frequency,
wherein the first control signal and the second control signal have a second frequency that is greater than the first frequency, and
wherein the first control signal and the second control signal are reciprocally phase-shifted by substantially 180° relative to the second frequency, such that the second control signal is identical to the first control signal but delayed in time corresponding to 1 divided by the second frequency multiplied by two, and such that an amplitude of higher harmonics of a sum of the first alternating current and the second alternating current is reduced.

2. The electric machine of claim 1, wherein,
the alternating current electric motor is a three-phase electric motor, and
the sum of the first alternating current and the second alternating current is a phase of a three-phase current.

3. The electric machine of claim 1, wherein the first semi-winding is arranged so as to behave as a primary winding of a transformer, and the second semi-winding is arranged so as to behave as a secondary winding of the transformer.

4. The electric machine of claim 1, wherein the first semi-winding and the second semi-winding have electric inductances having a same value.

5. The electric machine of claim 1, wherein the inverter further comprises a number N≥1 of first inverter branches electrically connected to the first semi-winding and a same number N≥1 of second inverter branches electrically connected to the second semi-winding.

6. The electric machine of claim 1, wherein each one of the first inverter branch and second inverter branch comprises:
a first switch;
a second switch connected in series to the first switch;
a first diode connected in anti-parallel configuration with the first switch; and
a second diode connected in anti-parallel configuration with the second switch;
wherein the first switch and the second switch are connected to the control unit, and
wherein the first switch and the second switch are configured to switch between an open state and a closed state.

7. The electric machine of claim 1, wherein the first control signal is configured to induce the first inverter branch to provide a first voltage across the first semi-winding,
wherein the second control signal is configured to induce the second inverter branch to provide a second voltage across the second semi-winding,
wherein the first voltage and the second voltage have a same waveform, and
wherein the first voltage and the second voltage are reciprocally delayed in time by substantially ½$f_P$.

8. The electric machine of claim 7, wherein the same waveform comprises a sequence of pulses with pulse frequency equal to the second frequency.

9. The electric machine of claim 1, wherein
the first semi-winding comprises three first sub-windings,
the three first sub-windings are electrically connected according to a "Y" configuration,
the second semi-winding comprises three second sub-windings, and
the three second sub-windings are electrically connected according to a "Y" configuration.

10. The electric machine of claim 1, wherein,
the three first sub-windings are electrically connected according to the "Δ" configuration, and
the three second sub-windings are electrically connected according to the "Δ" configuration.

11. The electric machine of claim 1, wherein the alternating current electric motor is a three-phase electric motor.

12. The electric machine of claim 11, wherein,
the three first sub-windings are electrically connected according to the "Y" configuration, and
the three second sub-windings are electrically connected according to the "Y" configuration.

13. The electric machine of claim 1, wherein the first semi-winding is arranged so as to behave as a primary winding of a transformer.

14. The electric machine of claim 1, wherein the second semi-winding is arranged so as to behave as a secondary winding of a transformer.

15. The electric machine of claim 1, wherein the inverter further comprises a plurality of first inverter branches electrically connected to the first semi-winding and a plurality of second inverter branches electrically connected to the second semi-winding.

16. The electric machine of claim 15, wherein a number of the plurality of first inverter branches is equal to number of the plurality of second inverter branches.

17. A method for supplying an alternating current electric motor that comprises a first semi-winding and a second semi-winding using an inverter that comprises a first inverter branch electrically connected to the first semi-winding and a second inverter branch electrically connected to the second semi-winding, the first semi-winding including three first sub-windings, the three first sub windings electrically connected according to a "Y" configuration or a "Δ" configuration, the second semi-winding including three second sub-windings, the three second sub-windings electrically connected according to a "Y" configuration or a "Δ" configuration, the method comprising:
providing a first control signal to the first inverter branch so as to induce a first alternating current in the first semi-winding; and
providing a second control signal to the second inverter branch so as to induce a second alternating current in the second semi-winding;
wherein the first alternating current and the second alternating current have a first frequency,
wherein the first control signal and the second control signal have a second frequency that is greater than the first frequency, and
wherein the first control signal and the second control signal are reciprocally phase-shifted by substantially 180° relative to the second frequency, such that the second control signal is identical to the first control signal but delayed in time corresponding to 1 divided by the second frequency multiplied by two, and such that an amplitude of higher harmonics of a sum of the first alternating current and the second alternating current is reduced.

18. An electric machine, comprising:
an alternating current electric motor comprising a first semi-winding and a second semi-winding, the first semi-winding including three first sub-windings, the three first sub-windings electrically connected according to a "Y" configuration or a "Δ" configuration, the second semi-winding including three second sub-windings, the three second sub-windings electrically connected according to a "Y" configuration or a "Δ" configuration;
an inverter comprising a first inverter branch electrically connected to the first semi-winding and a second inverter branch electrically connected to the second semi-winding; and
a control unit configured to provide a first control signal to the first inverter branch, so as to induce a first alternating current in the first semi-winding, and a second control signal to the second inverter branch, so as to induce a second alternating current in the second semi-winding;
wherein the first alternating current and the second alternating current have a first frequency,
wherein the first control signal and the second control signal have a second frequency that is greater than the first frequency, and
wherein the first control signal and the second control signal are reciprocally phase-shifted phase by 180° relative to the second frequency, such that the second control signal is identical to the first control signal but delayed in time corresponding to 1 divided by the second frequency multiplied by two, and such that an amplitude of higher harmonics of a sum of the first alternating current and the second alternating current is reduced.

* * * * *